United States Patent [19]
Ezekiel

[11] Patent Number: 4,526,381
[45] Date of Patent: Jul. 2, 1985

[54] MAGNETIC DISC LIQUID SUPPORTING

[76] Inventor: Frederick D. Ezekiel, 75 Allen St., Lexington, Mass. 02173

[21] Appl. No.: 575,514

[22] Filed: Jan. 31, 1984

[51] Int. Cl.³ .............................................. F16J 15/40
[52] U.S. Cl. ..................................... 277/80; 335/306
[58] Field of Search .................. 277/80; 335/302, 306

[56] References Cited

U.S. PATENT DOCUMENTS

| | | | |
|---|---|---|---|
| 3,354,329 | 11/1967 | Reich | 335/306 |
| 3,614,691 | 10/1971 | Miyata | 335/306 |
| 3,706,059 | 12/1972 | Theyse | 335/306 |
| 4,293,137 | 10/1981 | Ezekiel | 277/80 |
| 4,451,811 | 5/1984 | Hoffman | 335/302 |

FOREIGN PATENT DOCUMENTS

| | | | |
|---|---|---|---|
| 0773353 | 10/1980 | U.S.S.R. | 277/80 |
| 0889988 | 12/1981 | U.S.S.R. | 277/80 |

*Primary Examiner*—Robert I. Smith
*Attorney, Agent, or Firm*—Charles Hieken

[57] ABSTRACT

A pair of disc permanent magnets axially magnetized are fastened together in backing magnetic relationship with adjacent end faces of the same magnetic polarity and fastened to a housing. A ring of magnetic fluid around the inside edges of the permanent magnet discs engage a rotatable shaft and coact with the disc to seal the region between the shaft and housing. A bearing comprises a number of cascaded thin discs surrounding a nonmagnetic shaft. Nonmagnetic discs of thickness less than that of each magnetic disc may separate adjacent magnetic discs. Pole pieces of thickness less than that of each magnetic disc may separate adjacent magnetic discs and terminate in opposed pole faces adjacent the shaft defining a gap therebetween of gap width less than the thickness of each permanent magnet disc.

14 Claims, 10 Drawing Figures

MAGNETIC DISC LIQUID SUPPORTING

U.S. Pat. No. 4,293,137 describes a magnetic liquid shaft seal in the form of an axially magnetized disc. The present invention relates to an improvement whereby at least two such discs are used without a spacer in between.

The use of magnetic liquid in hydrodynamic bearings has been recognized for many years. ASME technical paper No: 75-DE-5 entitled "Uses of Magnetic Fluids in Bearings, Lubrication and Damping" points out several schemes for entrapping magnetic liquid between a rotating shaft and a bearing for the purpose of developing a load carrying capability as a function of shaft rotation. The advantage of the magnetic liquid and its retention thereof, is simply to ensure that a liquid film is always present between the shaft and the bearing, especially during start up. This feature will minimize contact between shaft and bearing and hence prolong the bearing life.

It is an object of this invention to provide a disc seal or bearing which has a greater differential pressure holding capability than a single seal or bearing.

Another object of the invention is to provide a shorter axial length for a multiplicity of seals.

Another object of the invention is to provide a multistage seal which can be loaded with magnetic liquid from one side after installation.

An object of the invention is to provide a multitude of magnetic poles all along the internal surface of the bearing where magnetic liquid can be attracted and retained. This is an improvement over prior art which basically dealt with providing a single mechanism for magnetic liquid retention. This concept of multitude of magnetic poles or distributed poles ensures that magnetic liquid is positively attracted at many locations between the shaft and the bearing. This will minimize the possibility of physical contact between the shaft and the bearing during the start-up phase before a hydrodynamic film is established. In addition this method of retention will minimize the loss of liquid due to shock, vibration and other disturbances whether the shaft is rotating or not.

An assembly according to the invention may comprise two or more discs assembled in such a way as to have the like magnetic poles in contact with each other. Since these discs tend to repel each other, a suitable adhesive may be used to retain them together. An alternate method is to retain the individual discs together by providing an axial retaining force or by press-fitting the discs in a housing. Preferably each individual disc is in the form of a flat, axially magnetized washer. In one embodiment, one can be the holder of the other. This type of seal or bearing can be used in conjunction with magnetic or nonmagnetic shafts and housings.

An important advantage of using a multiplicity of individual seals magnetized with like poles facing each other, is to increase the differential pressure holding capability. It has been found that, for example, when two discs are used according to the invention, the resulting differential pressure capability is more than twice the pressure capability of each individual disc. Such an improvement will not result if the discs were to be mounted with unlike poles together.

Another advantage is the use of magnetic liquid to seal the outside diameter of the seal assembly when the seals are press-fitted in the housing.

Numerous other features, objects and advantages of the invention will become apparent from the following specification when read in conjunction with the accompanying drawing in which.

Figure 1:
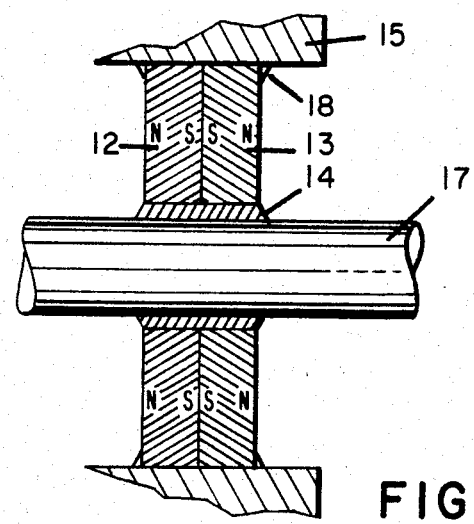
FIG. 1 shows a sectional view of two seals assembled together with like magnetic poles facing each other, magnetic liquid between the shaft and the inside diameter of the seals and magnetic liquid on the outside diameter also.

With reference now to the drawing and more particularly FIG. 1 thereof, there is shown a housing 15, a shaft 17 and discs 12 and 13 abutted together. These discs are made of magnetic material and are magnetized axially as shown with the magnetic poles abutted together. Discs 12 and 13 form one assembly which may be either press-fitted in housing 15, or cemented in place. In many cases, pressfitting the seal in the housing provides adequate sealing at the outside diameter. However, as an additional safety measure against leakage, sealing means 18, such as magnetic liquid or cement, may be deposited at the interface between the outside diameter of the seal and the housing internal diameter. The gap between the internal diameters of discs 12 and 13 and shaft 17 is filled in with magnetic liquid 14 which forms the dynamic seal.

Figure 2:
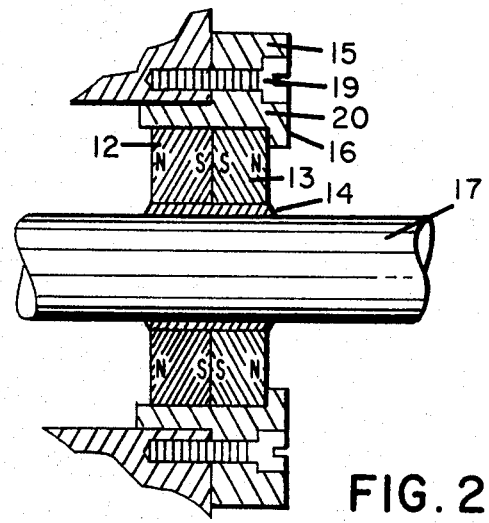
FIG. 2 shows a sectional view of two seals mounted in a holder secured to the housing by means of bolts.

FIG. 2 shows another embodiment of the invention with two discs 12 and 13 mounted in a holder 20 which is in turn face mounted to the housing by means of screws 19.

Figure 3:
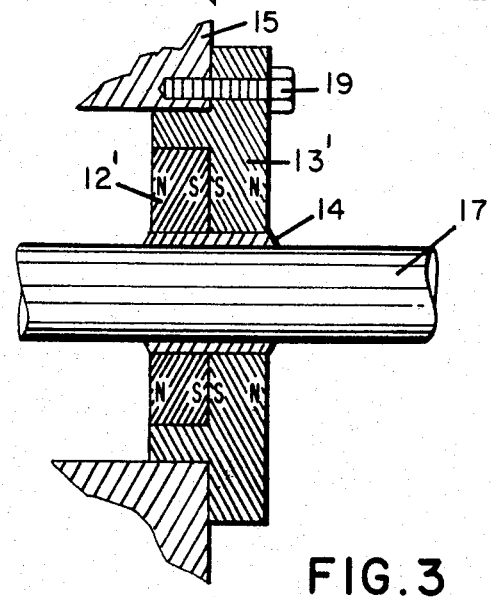
FIG. 3 shows a sectional view of two seals where one of them serves as the holder for the other.

FIG. 3 shows another embodiment of the invention with disc 13' also functioning as a holder for disc 12'.

Figure 4:
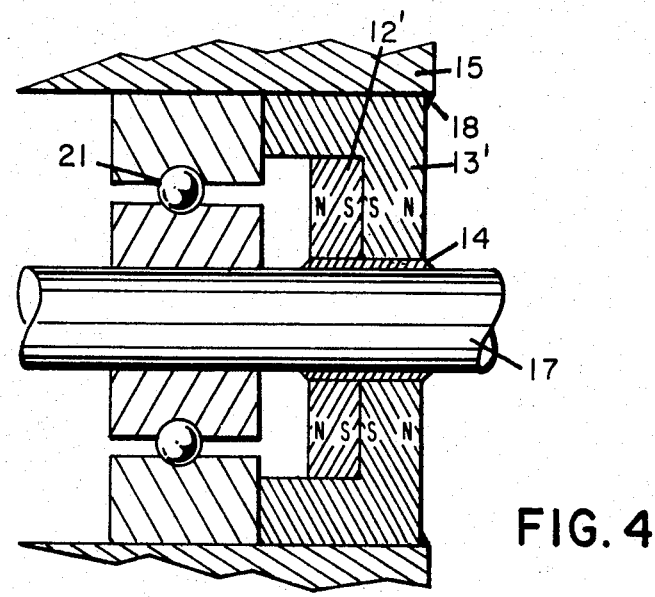
FIG. 4 shows two seals wherein one seal serves as the holder for the other while being mounted inside a housing in the proximity of a ball bearing.

FIG. 4 shows a typical seal assembly mounted against ball-bearing 21 in housing 15.

Figure 5:
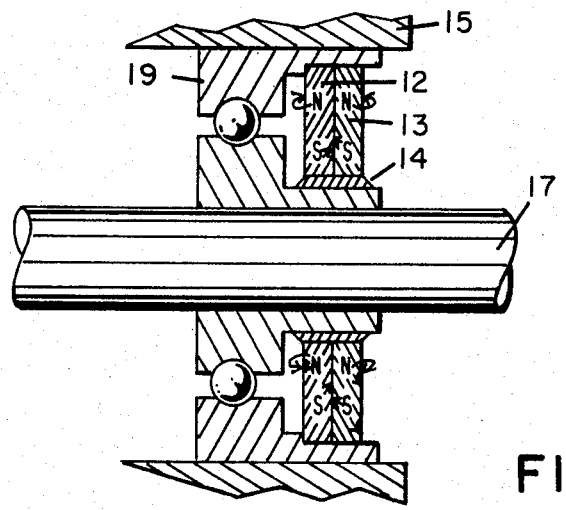
FIG. 5 shows a sectional view of two seals mounted between the outer and inner races of a ball bearing.

FIG. 5 shows another embodiment with discs 12 and 13 mounted in a ball-bearing between extended inner and outer races 19 as shown.

Figure 6:
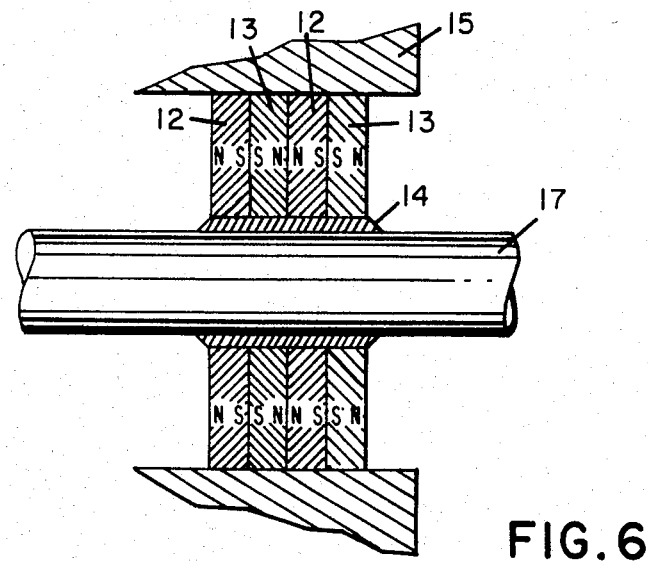
FIG. 6 shows a sectional view of a multiplicity of seals assembled together to form an integral seal.

FIG. 6 shows another embodiment with a multiplicity of discs 12 and discs 13 mounted together with like poles adjacent to each other.

The specific structure of the magnetic discs corresponds substantially to the discs described in U.S. Pat. No. 4,293,137, the disclosure of which is hereby incorporated by reference. These discs typically have a thickness within the range of 0.003 to 0.1 inches and the height of each disc is significantly greater than the disc thickness. These disc seals are commercially available from Servoflo Corporation, 75 Allen Street, Lexington, Mass. 02173.

Figure 7:
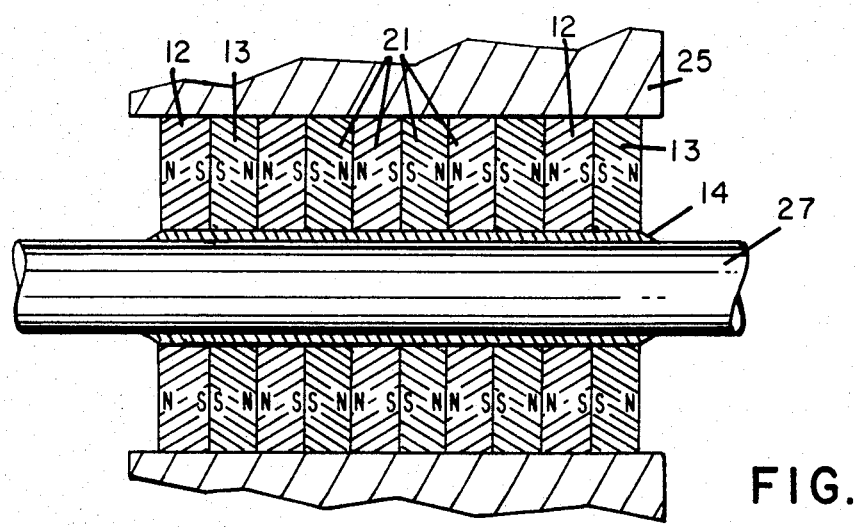
FIG. 7 shows a sectional view of a hydrodynamic bearing wherein the bearing is made of a multitude of permanent magnetic discs which are alternately axially magnetized.

With reference now to FIG. 7 there is shown housing 25 which can be made of magnetic or nonmagnetic material, shaft 27 which is preferably made of nonmagnetic material, and bearing 21 comprising a multitude of permanent disc magnets 12 and 13. These discs are alternately magnetized as shown and are secured together either with an adhesive or some mechanical force. Magnetic liquid 14 is shown trapped between bearing 21 and shaft 27. Because of this magnetic structure, the retention forces are stronger at each interface between two adjacent discs. Therefore, the magnetic liquid will be distributed all along the internal surface of bearing 21 in the form of a film which is essential for hydrodynamic action.

Figure 8:
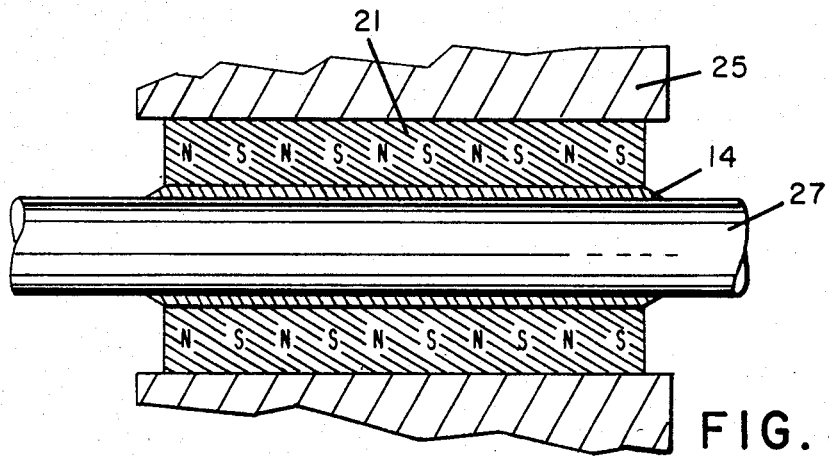
FIG. 8 shows a bearing in the form of a cylinder having its internal diameter magnetized alternately in concentric bands.

FIG. 8 is similar to FIG. 7 with the exception that bearing 21 is in the form of a sleeve made up of a permanent magnet material magnetized as shown with the magnetic poles being concentric axial bands on the internal surface of the sleeve. Here again, because of the varying strength of the magnetic forces along the internal surface of bearing 21, the magnetic liquid, in the absence of shaft rotation, will distribute itself in bands corresponding to the magnetic poles.

Figure 9:
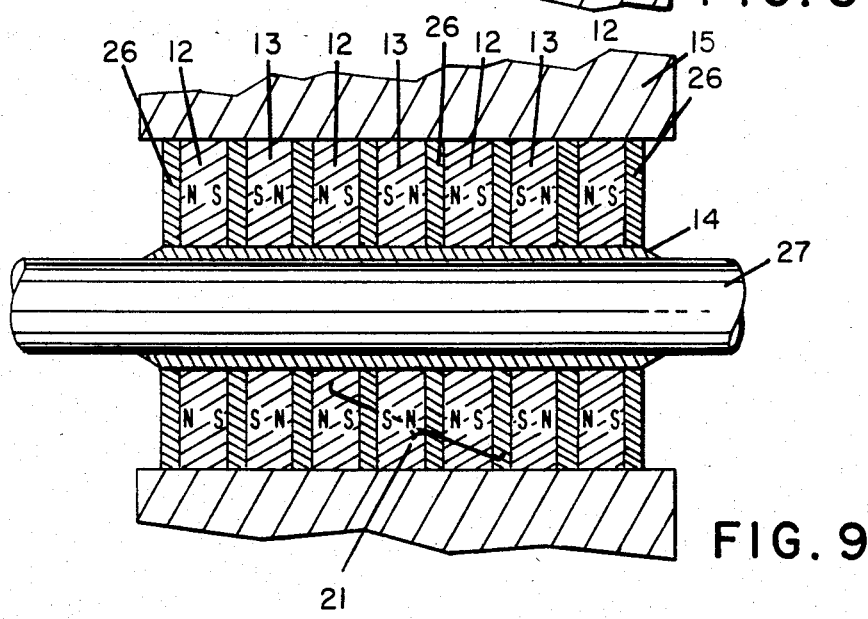
FIG. 9 shows a bearing made up of permanent magnetic discs, alternately magnetized and separated by permeable magnetic washers.

FIG. 9 shows a configuration similar to that shown in FIG. 7 with the addition of magnetically-permeable washers 26 between the permanent magnet discs 12 and 13. The purpose of washers 26 is to enhance the magnetic field on the internal surface of bearing 21 by collecting magnetic flux from the axial surfaces of discs 12 and 13. In this configuration, the housing material is preferably nonmagnetic.

Figure 10:
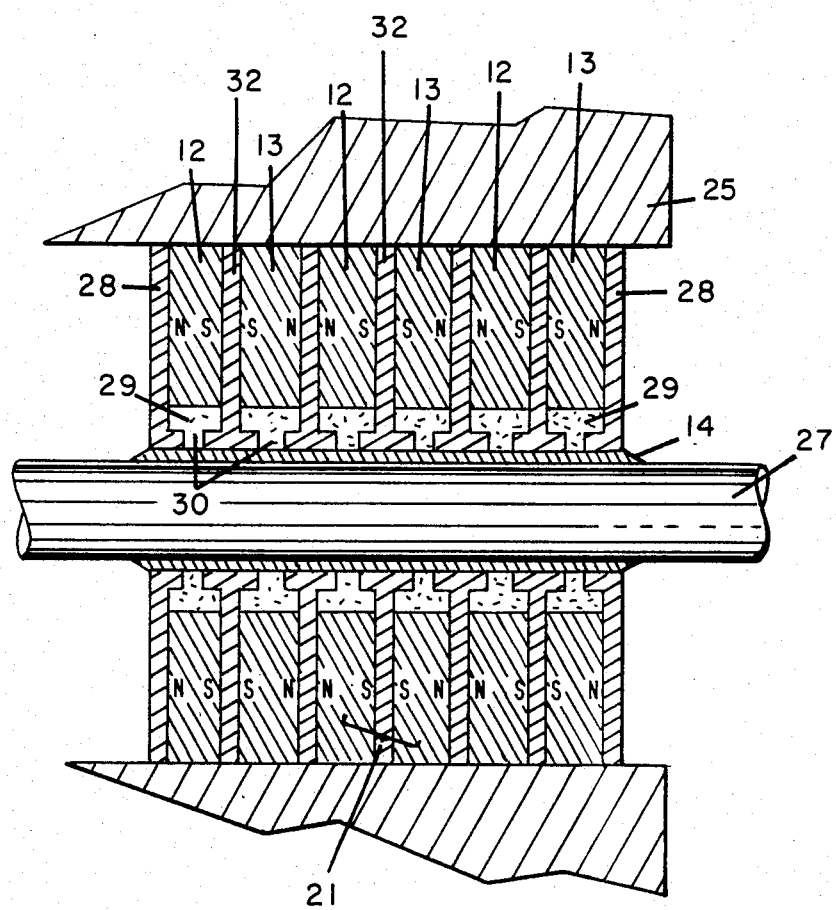
FIG. 10 shows a bearing made up of permanent magnetic discs separated by more elaborate pole pieces for focusing the magnetic field.

FIG. 10 shows still another configuration in which the magnetic flux is further focused at gaps 30 between two consecutive discs 12 and 13. In order to provide a smooth internal surface in bearing 21, an epoxy or other suitable material may be used to fill the voids between permanent magnet discs 12 and 13 and pole pieces 28 and 32 including gaps 30. The material of housing 25 in this configuration is preferably nonmagnetic in order not to short out the magnetic flux from the permanent magnets 12 and 13.

There has been described novel apparatus and techniques for improving the sealing function of two magnetic liquid shaft seals. It is evident that those skilled in the art may now make numerous modifications and uses of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Magnetic sealing apparatus comprising,
   first and second thin permanent magnet means each characterized by a cross section having a thickness dimension between opposed end faces of the magnet means that is smaller than a height dimension thereof and magnetized along an axis parallel to said thickness dimension for establishing a magnetic field along at least one exposed surface thereof between said end faces which magnetic field is generally parallel to said axis,
   a closed loop of magnetic fluid along said at least one exposed surface maintained thereat by said magnetic field thereat,
   one of said end faces being a north magnetic pole and the other being a south magnetic pole,
   and means for fastening said first and second thin permanent magnet means together along said axis with adjacent contacting end faces being of the same polarity.

2. Magnetic sealing apparatus in accordance with claim 1 and further comprising,
   means for fastening said first and second thin permanent magnet means to said first member,
   said closed loop of magnetic fluid being in sealing relationship between said at least one exposed surfaces and said second member.

3. Magnetic sealing apparatus in accordance with claim 2 and further comprising a housing,
   and a shaft rotatable in said housing,
   the region between said shaft and housing sealed by said magnetic sealing apparatus.

4. Magnetic sealing apparatus in accordance with claim 3 wherein said means for fastening said first and second permanent magnet means together comprises said housing,
   said first and second thin permanent magnet means being force fit in said housing.

5. Magnetic sealing apparatus in accordance with claim 3 wherein said means for fastening said first and second thin permanent magnet means together comprises cement means for cementing said first and second thin permanent magnet means to said housing.

6. Magnetic sealing apparatus in accordance with claim 3 wherein said means for fastening comprises holding means in which said first and second thin permanent magnet means are seated for accommodating said first and second thin magnet means in sealing relationship with said housing,
   and fastening means for fastening said holder means to said housing in sealing relationship therewith.

7. Magnetic sealing apparatus in accordance with claim 3 wherein said means for fastening said first and second thin permanent magnet means together comprises holding means in said first thin permanent magnet means for accommodating said second thin permanent magnet means,
   and means for fastening said first thin permanent magnet means to said housing in sealing relationship therewith.

8. Magnetic sealing apparatus in accordance with claim 3 and further comprising,
   ball bearing means,
   said first and second thin permanent magnet means being adjacent to said ball bearing means between said housing and said shaft.

9. Magnetic sealing apparatus in accordance with claim 7 wherein said ball bearing means is formed with first and second races fastened to said housing and shaft respectively and formed with holding means for accommodating said first and second thin permanent magnet means,
   said first and second thin permanent magnet means being seated in said holder means.

10. Magnetic sealing apparatus in accordance with claim 1 and further comprising at least a third of said thin permanent magnet means,
    and means for fastening said third of said thin permanent magnet means along said axis adjacent to one of said first and second permanent magnet means with adjacent faces thereof being of opposite magnetic polarity.

11. Magnetic sealing apparatus in accordance with claim 9 wherein said shaft is nonmagnetic.

12. Magnetic sealing apparatus in accordance with claim 11 wherein said housing is nonmagnetic.

13. Magnetic sealing apparatus in accordance with claim 12 and further comprising,
nonmagnetic spacers between adjacent ones of said thin permanent magnet means,
the thickness of each spacer being less than the thickness of each thin permanent magnetic means.

14. Magnetic sealing apparatus in accordance with claim 12 wherein said housing is nonmagnetic and further comprising,
magnetic members embracing each thin permanent magnet means and defining opposed pole faces near said shaft having a gap less than the thickness of each of said thin permanent magnet means with the thickness of the pole pieces being less than that of each of said thin permanent magnet means.

* * * * *